UNITED STATES PATENT OFFICE.

SHADRACH T. SMITH, OF KASSON, MINNESOTA, ASSIGNOR TO SAMUEL H. MOORE AND EDWARD Y. MOORE, OF CHICAGO, ILLINOIS.

IMPROVEMENT IN STOVE-POLISHING COMPOSITIONS.

Specification forming part of Letters Patent No. 205,694, dated July 2, 1878; application filed May 29, 1878.

*To all whom it may concern:*

Be it known that I, SHADRACH T. SMITH, of Kasson, in the county of Dodge and State of Minnesota, have invented certain new and useful Improvements in Stove-Polish; and I do hereby declare that the following is a full, clear, and exact description thereof, which will enable others skilled in the art to which it appertains to make and use the same.

The nature of my invention consists in a compound for stove-polish, as will be hereinafter more fully set forth.

This compound consists of the following ingredients, in about the following proportions, to wit: Five pounds plumbago, five ounces lamp-black, ten ounces rosin, one ounce gum-arabic, five ounces borax, and one-half pint whisky.

The plumbago, rosin, and borax, are mixed dry. The lamp-black is cut with the whisky separately, and the gum-arabic dissolved in water, after which the solution of gum-arabic is added to the lamp-black and whisky. All the ingredients are then mixed thoroughly, and the mass made into sticks of any desired size, which soon harden, when they are ready to be put up in wrappers for market.

To use this stove-polish, a suitable quantity, according to the size of the stove or stoves to be polished, is dissolved in cold water to about the consistency of cream, and this applied to the stove with a brush or cloth.

The stove may be either hot or cold, and may be polished either before or after the polish becomes dry.

In the manufacture of my stove-polish I do not confine myself to the precise proportions of the ingredients mentioned, as I may perhaps, under certain circumstances, vary the same.

Having thus fully described my invention, what I claim as new, and desire to secure by Letters Patent, is—

The within-described compound for stove-polish, consisting of plumbago, lamp-black, rosin, gum-arabic, borax, and whisky, in about the proportions herein set forth.

In testimony that I claim the foregoing as my own I have hereto affixed my signature in presence of two witnesses.

SHADRACH T. SMITH.

Witnesses:
JONATHAN A. SMITH,
HENRY L. COMAR.